Aug. 25, 1964    M. F. ROYSTON    3,145,614
MOTION PICTURE PROJECTOR HAVING A SINGLE FRAME CLUTCH
Filed March 20, 1959    8 Sheets-Sheet 1

Fig. 1.

INVENTOR.
Marvin F. Royston
BY
Robert F. Miehle
Atty.

Aug. 25, 1964   M. F. ROYSTON   3,145,614
MOTION PICTURE PROJECTOR HAVING A SINGLE FRAME CLUTCH
Filed March 20, 1959   8 Sheets-Sheet 3

INVENTOR.
Marvin F. Royston
BY
Robert F. Miehle, Jr.
Atty.

Aug. 25, 1964        M. F. ROYSTON        3,145,614
MOTION PICTURE PROJECTOR HAVING A SINGLE FRAME CLUTCH
Filed March 20, 1959                     8 Sheets-Sheet 4

INVENTOR,
Marvin F. Royston
BY
Robert F. Miehle, Jr.
Atty.

Aug. 25, 1964

M. F. ROYSTON 3,145,614

MOTION PICTURE PROJECTOR HAVING A SINGLE FRAME CLUTCH

Filed March 20, 1959

INVENTOR.
Marvin F. Royston
BY
Robert F. Michle
Atty.

United States Patent Office 3,145,614
Patented Aug. 25, 1964

3,145,614
MOTION PICTURE PROJECTOR HAVING A SINGLE FRAME CLUTCH
Marvin F. Royston, Skokie, Ill., assignor to Bell & Howell Company, Chicago, Ill., a corporation of Illinois
Filed Mar. 20, 1959, Ser. No. 800,877
7 Claims. (Cl. 88—17)

This invention relates to a motion picture projector having a single frame clutch, and more particularly to a clutch operable to drive a single revolution both in forward and reverse to provide single frame projection in both forward and reverse.

An object of the invention is to provide a new and improved clutch.

Another object of the invention is to provide a clutch in the drive of a motion picture projector operable to move film a single frame and operable in both forward and reverse.

Another object of the invention is to provide a clutch operable to drive a single revolution selectively in forward or reverse.

Another object of the invention is to provide a clutch operable to drive the sprockets and shuttle of a motion picture projector through a single revolution of the drive shaft of the projector to advance film a distance of one frame selectively in either the forward direction or the reverse direction.

A further object of the invention is to provide a drive having a drive shaft rotatable continuously in either forward or reverse together with a clutch adapted to drive a driven member for one revolution either in forward or reverse.

The invention provides a motion picture projector adapted to selectively project one frame at a time in both forward and reverse directions. The projector may include a reversible drive shaft driven continuously in either direction along with a driving clutch member keyed to the shaft and a driven clutch member rotatable relative to the shaft. A detent carried by the driven member is urged to a position entering an opening in the driving clutch member, and a manually controlled latching dog or pawl is movable toward the driven member to sequentially actuate a cam to move the detent out of engagement with the driving clutch member and enter a peripheral notch in the driven clutch member to stop the driven member in an oriented position. The detent moves a thrust member to hold the shuttle of the projector out of film engaging position so that a single frame of the film remains at the aperture of the projector. To bring the next frame to the aperture, the operator causes the pawl to be momentarily retracted from the notch and the cam and the detent releases the shuttle holdout and re-enters the opening in the driving clutch member and the driven clutch member is driven to drive the film feeding sprockets and also the take-up reel or the supply reel depending on whether the projector is being operated in forward or reverse. The sprockets and shuttle advance the film one frame during one revolution of the drive shaft and, meanwhile, the pawl is released and moves into the path of the cam. Then as the driven clutch member finishes its revolution the cam is caught by the pawl to first throw out the clutch and then enter the notch in the driven member to stop the driven member after exactly one revolution. The cam again renders the shuttle feed inoperative after a single feed stroke of the shuttle.

Figure 1:
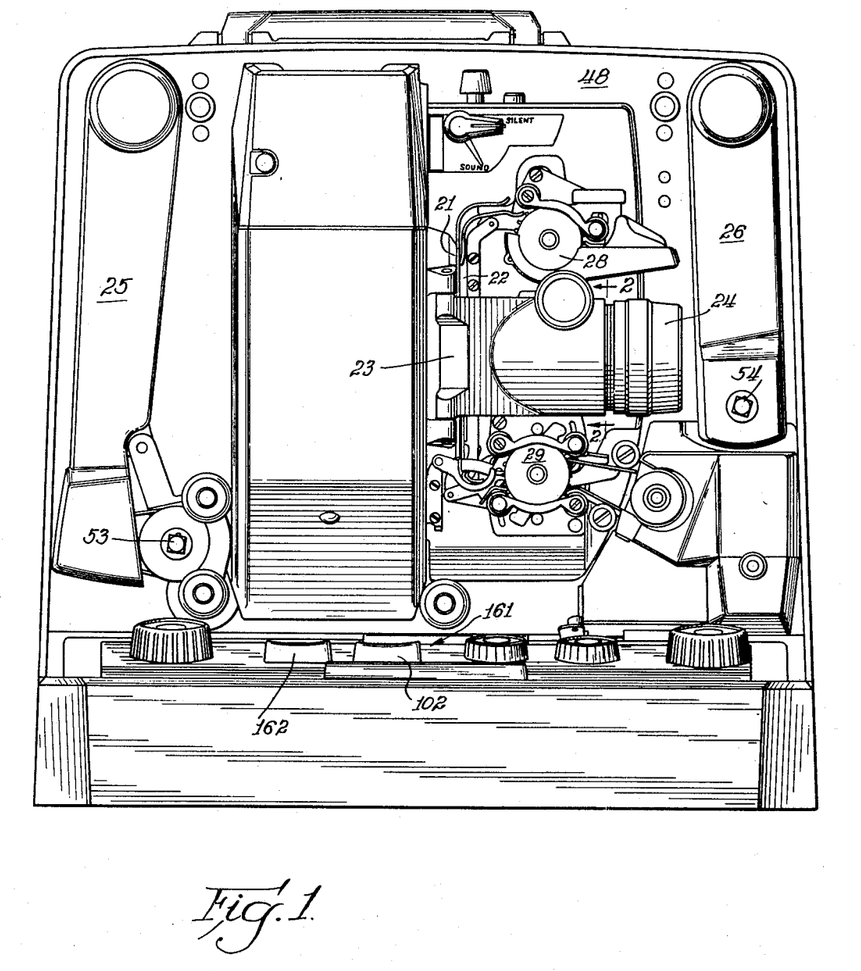
FIG. 1 is a side elevation view of a motion picture projector forming a specific embodiment of the invention.
Figure 18:
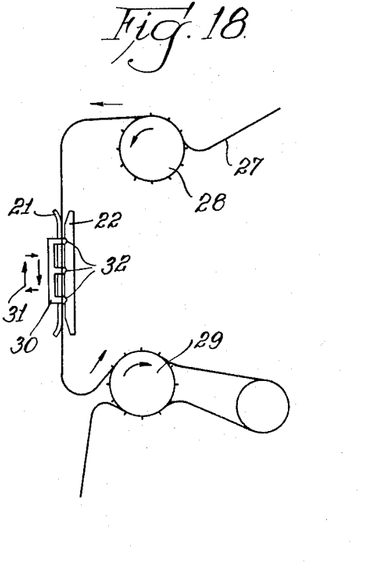
FIGS. 18 and 19 are schematic views illustrating the feed of the film in forward and reverse directions.

Referring now in detail to the drawings, a motion picture projector is shown in FIG. 1 and includes an aperture plate 21 and a pressure plate 22 carried by a gate 23 supporting a projector lens system 24. Take-up and supply arms 25 and 26 may be swung from their retracted positions to their operating positions and film take-up and supply reels (not shown) mounted thereon. The projector may be driven in the forward direction to advance a film intermittently between the aperture plate and the pressure plate 24 to show motion pictures, or selectively, it may be operated to advance the film 27 forwardly one frame and then show that frame until the operator actuates the projector to advance the film one more frame. It also may be selectively operated to run several frames and then operate to show a single frame for desired length of time. During the motion picture forward run, illustrated best in FIG. 18, an upper sprocket 28 and lower sprocket 29 are rotated continuously to advance the film continuously from a braked supply reel and a slip clutch driven take-up reel and a shuttle 30 is driven in a parallelogram path 31 to intermittently pull down the film a distance of one frame for each reciprocation of the shuttle. During forward single frame projection with one frame being projected at the aperture, the sprockets 28 and 29 and the reels are stationary and the shuttle 30 is held out of driving engagement with the film, teeth 32 of the shuttle being held out of the perforations in the film while the shuttle continues to reciprocate vertically. Then the operator actuates the projector and the shuttle is released to permit it to engage and feed the film one frame length downwardly along the aperture plate and then is again held out of driving engagement. This actuation also causes the sprockets 28 and 29 to be driven in their forward feeding directions for one frame length of film and then are stopped. The take-up reel also is driven by its slip clutch (not shown) of known construction to take up one frame length.

Figure 19:
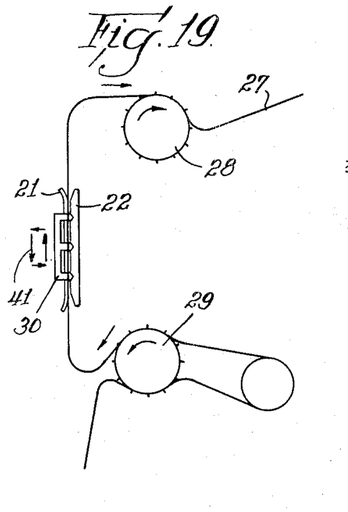

The operator also may selectively actuate the projector either for reverse motion operation or reverse single frame projection. In motion operation, the sprockets 28 and 29 are driven in the directions shown in FIG. 19, the shuttle 30 is driven along path 41 to intermittently advance the film upwardly between the aperture and pressure plates 21 and 22, the take-up reel is braked, and the supply reel is driven by a slip clutch (not shown) of known construction in a film take-up direction. In reverse single frame projection, on each actuation by the operator, the sprockets 28 and 29 and the supply reel are driven in their reverse directions one frame length and then are stopped, and the shuttle 30 is permitted to engage the film during its upward stroke of one reciprocation and then is held out of engagement with the film.

Figures 2, 4:
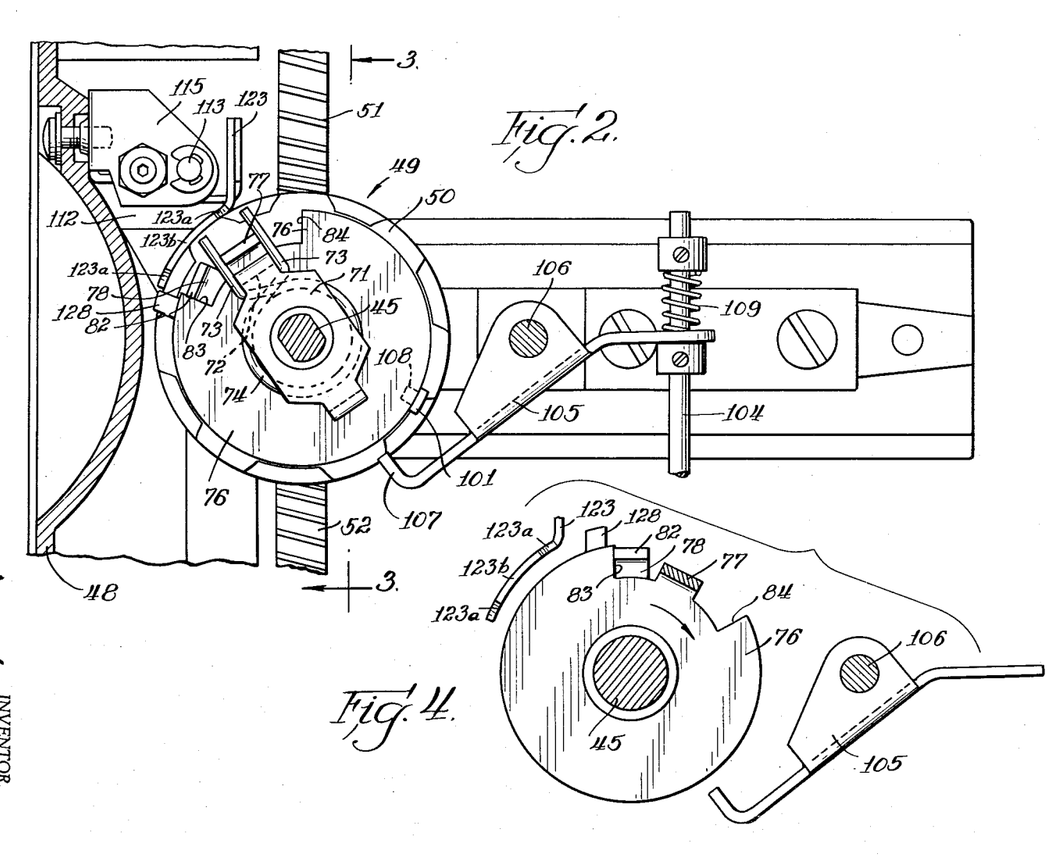
FIG. 2 is an enlarged, fragmentary vertical section taken along line 2—2 of FIG. 1, and showing the clutch of the projector.
FIG. 4 is a fragmentary vertical section taken along line 4—4 of FIG. 3.
Figures 3, 9:
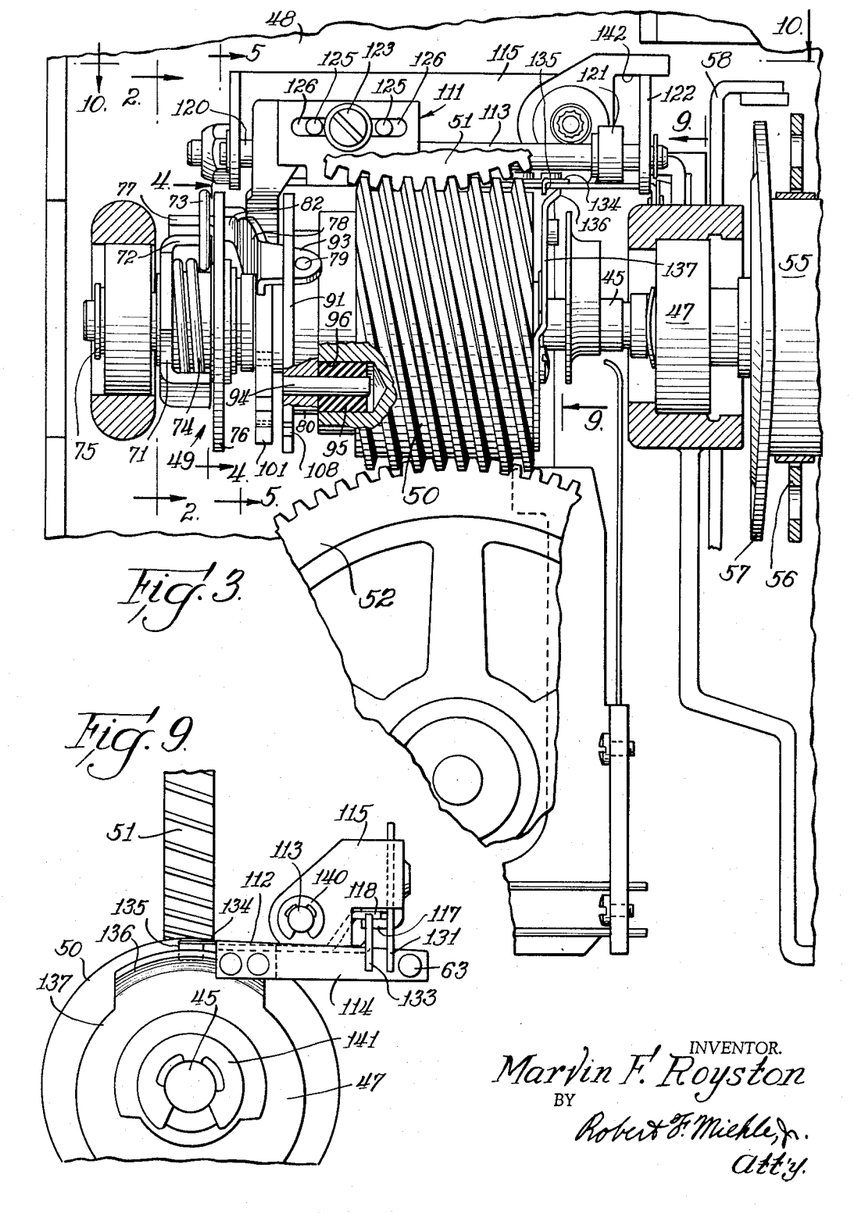
FIG. 3 is a fragmentary vertical section taken along line 3—3 of FIG. 2.
FIG. 9 is a section taken along line 9—9 of FIG. 3.

During forward operation, both for motion and single frame projection, a drive shaft 45 is rotated continuously in a clockwise direction, as viewed in FIG. 2 by known selectively reversible drive means (not shown), and, for reverse operation, both for motion and single frame projection, the drive shaft is rotated continuously in the counterclockwise direction. The shaft is mounted in bearings 46 and 47 (FIG. 3) supported by an upright frame plate 48. The drive of the sprockets is effected by the shaft 45 through a clutch 49 which may be selectively actuated to drive continuously in either direction or for one revolution only selectively in either direction. The clutch connects the drive shaft 45 to a worm 50 mounted freely rotatably on the shaft 45, and the worm 50 drives worm gears 51 and 52 to which the sprockets 28 and 29 are keyed. Also driven by the worm 50 are take-up and supply reel spindles 53 and 54 (FIG. 1) by known means (not shown) including one-way clutches and belt drives. The shaft 45 has an eccentric cam 55 (FIG. 3) keyed thereto for pivoting shuttle lever 56 so as to reciprocate the shuttle 30 (FIG. 18) vertically once for each revolution of the shaft, and a wobbler cam 57 (FIGS. 3, 10 and 11) is keyed to the shaft 45 to permit the lever 56 and shuttle 30 to reciprocate once horizontally during each revolution of the shaft 45. The shuttle lever is pivoted facewise by the wobbler cam through an arm 58 pivoted on a fixed pin 59, the arm 58 carrying a cam follower 60 and is urged by a spring (not shown) in a counterclockwise direction, as viewed in FIG. 11, to normally hold the follower 60 against the wobbler cam. The arm 58 has a fork or bracket position 61 secured by resilient cushions 62 to the lever 56 to move the lever 56 facewise and also permit vertical pivoting of the lever 56. The arm 58, when unrestrained, holds the cam follower 60 against the wobbler cam so that the shuttle may move into feeding engagement with the film once during each vertical reciprocation of the shuttle. However, to hold the shuttle inoperative during single frame projection pauses, a presser 63 holds the arm 58 in a position holding the lever 56 away from the aperture plate 21 and the shuttle 32 out of engagement with the film. The operation of presser 63 is controlled by the clutch 49.

Figure 5:
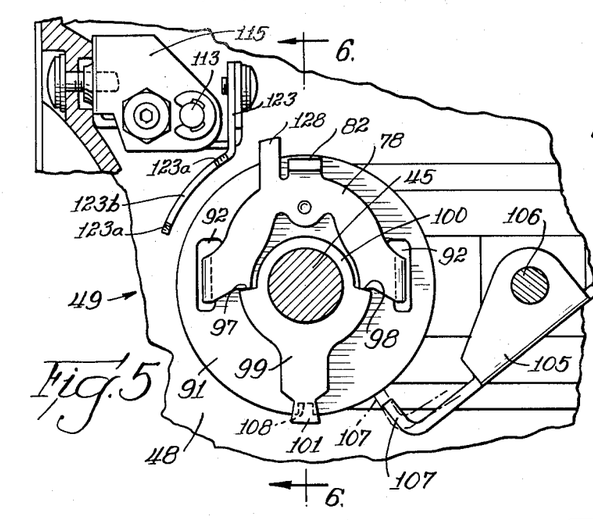
FIG. 5 is a fragmentary vertical section taken along line 5—5 of FIG. 3.

The clutch 49 includes an arm 71 (FIGS. 2 and 3) keyed to shaft 45 and having a lug 72 projecting between ends 73 of a torsion spring 74. The arm 71 is held on the shaft 45 in keyed relationship by the bearing 46 which holds the shaft against endwise movement by a snap ring 75. Hence, the arm 71 is rotated with the shaft. The ends 73 of the spring 74 resiliently couple the arm 71 to a driving clutch plate or disc 76 by a lug 77 of the disc which projects between the ends 73 of the spring. A yoke or detent 78, which is shown most clearly in FIGS. 4, 5 and 8 and mounted on aligned pins 79 fixed to hub 80, normally is urged by spring 81 to a clutching position in which a lug 82 of the detent projects between driving shoulders 83 and 84 (FIG. 2) of the clutch plate 76. Shoulders 83 and 84 form sides of a notch in the plate and the notch is much wider than the lug 82 to provide lost motion or overtravel and proper timing of the yoke or detent 78 and the clutch plate 76. To drive the yoke 78 in the forward feed direction, the shoulder 83 engages the lug 82, and to drive the yoke 78 in the reverse feed direction, the shoulder 84 engages the lug 82, FIG. 4 showing the forward feed.

Figures 7, 8:
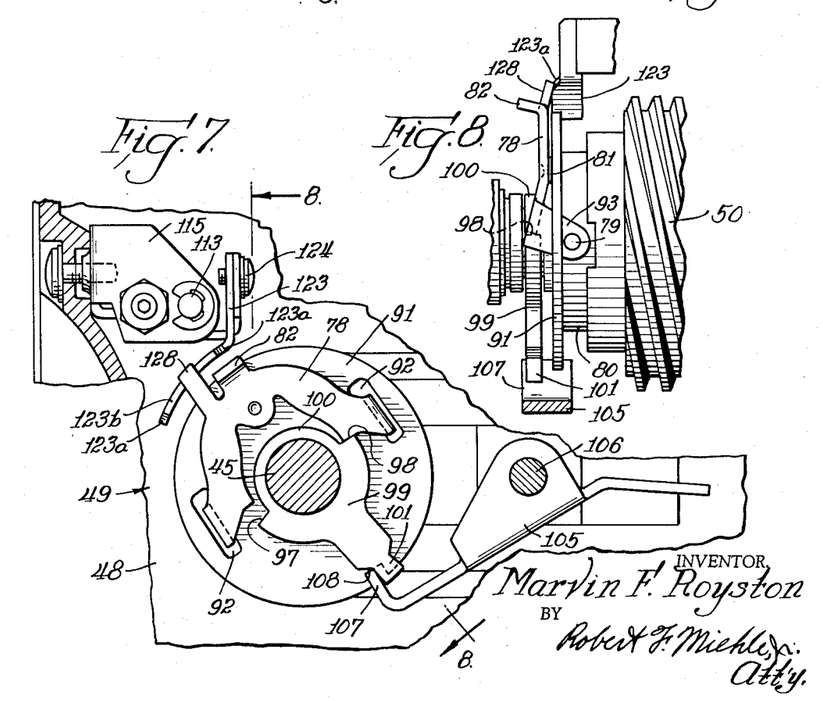
FIG. 7 is a view similar to FIG. 6 but with parts of the clutch in different positions.
FIG. 8 is a section taken along line 8—8 of FIG. 7.

The hub 80 forms an integral part of driven clutch disc or plate 91 having clearance slots 92 to permit pivotal movement of arms 93 of the yoke 78. The hub 80 is keyed resiliently to the worm 50 by pins 94 (FIG. 3) fixed to the hub and projecting through resilient bushings 95 of rubber or rubber-like material and seated in sockets 96 in the adjacent end of the worm. The driving clutch plate 76 drives the driven clutch plate and therefore the worm whenever the lug 82 extends between the shoulders 83 and 84, and rotates freely relative to the driven clutch plate and worm whenever the yoke is retracted as best illustrated in FIG. 8. The yoke is always in its driving position except when cammed to its retracted position either by a camming shoulder 97 (FIG. 5) or a camming shoulder 98 of an actuating cam 99. The cam 99 has a collar portion 100 freely rotatable on the shaft 45, and also is provided with a rigid actuating finger 101 projecting radially therefrom beyond the periphery of the driven clutch disc 91.

To declutch the driven clutch plate 91, the operator presses a switch button 102 (FIGS. 1, 20 and 21) to energize a solenoid 103 (FIGS. 10 and 20) to pull a rod 104 downwardly, as viewed in FIG. 2, the rod 104 is connected resiliently to one end of a latching pawl 105 mounted pivotally on fixed pin 106. The pawl then moves a hook portion or dog 107 thereof upwardly against the periphery of the driven clutch plate 91, and when the finger 101 of the cam 99 is swung into engagement with the hook 107, the hook holds the cam against further rotation with the disc 91 and yoke 78. Since the lug 82 still projects into the notch in the driving clutch disc 76, the yoke 78 is rotated relative to the cam 99 and the cam 99 pivots the yoke 78 out of engagement with the driving clutch disc 76 to disconnect the drive. As this declutching action occurs, a peripheral notch 108 in the driven disc moves away from directly behind the finger 101. However, the inertia of the rapidly rotating clutch disc 91 and worm 50 cause a few degrees of overtravel of disc 91 and worm beyond the position of the disc 91 in which a notch 108 first clears the finger 101 sufficiently to permit entrance of the dog 107 into the notch 108. The notch 108 is sufficiently wide that this overtravel does not prevent entrance of the dog 107 into the notch. At the extreme overtravel position of the disc 91, the resilient bushings 95 are compressed and the spring 81 is highly compressed to cause the worm 50 and disc 91 to slowly rebound. During this slow rebound, spring 109 (FIG. 2) slides the dog 107 inwardly along the finger 101 into the notch 108 (FIG. 7) and the left hand wall of the notch 108 comes back against the dog 107. The disc 91 and worm 50 are latched in these positions by the dog 107, and the yoke 78 is held in its declutched position by the arm 99.

The action of spring 109 (FIG. 2) on the rod 104 presses the hook 107 into the notch 108 to stop the disc 91 in an oriented position and to hold the cam 99 in a position locking the yoke 78 in a declutched position. Thus the hook 107 latches the clutch in a declutched condition illustrated best in FIGS. 7 and 8. FIG. 8 shows the declutched condition of the clutch 49 for forward running of the projector in which the shaft 45 is rotated clockwise. When the clutch 49 is declutched for reverse running of the projector in which the shaft 45 is rotated counterclockwise, the hook 107 is seated in the notch 108 but the finger 101 is held to the left of the hook rather than to the right thereof as shown in FIG. 7 and, instead of the camming shoulder 98 holding the yoke 78 retracted, the camming shoulder 97 holds the yoke 78 in its retracted or declutching position.

Figure 6:
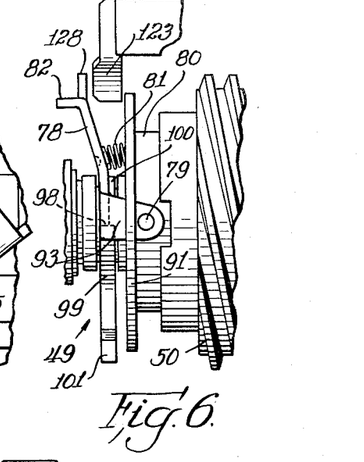
FIG. 6 is a fragmentary vertical section taken along line 6—6 of FIG. 5.

Assuming the clutch 49 to be in a disconnected condition, to advance the film forwardly one frame, the operator actuates the switch button 102 to momentarily de-energize the solenoid 103 (FIG. 10), and the solenoid moves the pawl 105 (FIG. 7) momentarily to its retracted position freeing the finger 101 and disc 91. The spring 81 (FIGS. 6 and 8) immediately moves the yoke from its retracted position of FIG. 8 toward its clutching position of FIG. 6, and the spring pressed yoke moves the finger 101 over the notch 108 (FIG. 7) and in the path of the hook 107 to prevent relatching of the disc 91 and also holds the pawl from recatching the finger 101. The solenoid then is manually re-energized momentarily to permit the spring 109 to urge the hook 107 of the pawl 105 in a clockwise direction, as viewed in FIG. 7, toward its latching position. As soon as the notch in the driving disc 76 comes around to the lug 82 of the yoke 78, the lug enters the notch and rotates the yoke, the driven clutch disc 91 and the worm 50 with the disc 76. The worm drives the sprockets 28 and 29 to advance the film downwardly one frame, the shuttle 30 also being operative for one reciprocation. Then, at the end of a single revolution of the worm, the hook 107 (FIG. 7) again engages the finger 101, disconnects the clutch and drops into the notch 108 to latch the worm in its oriented position.

Figure 10:
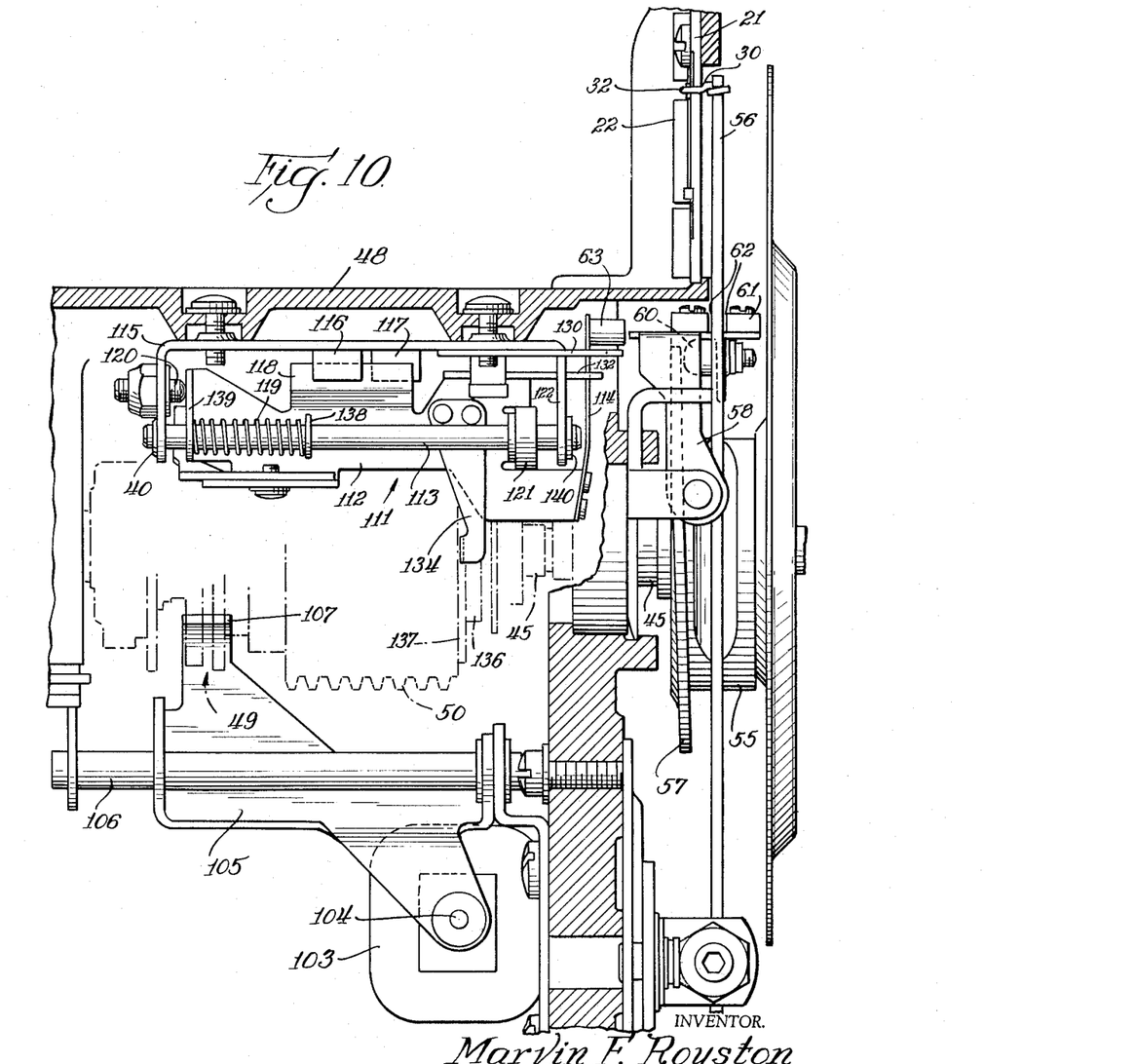
FIG. 10 is a horizontal section taken along line 10—10 of FIG. 3, with the clutch in a disconnecting condition.
Figure 11:
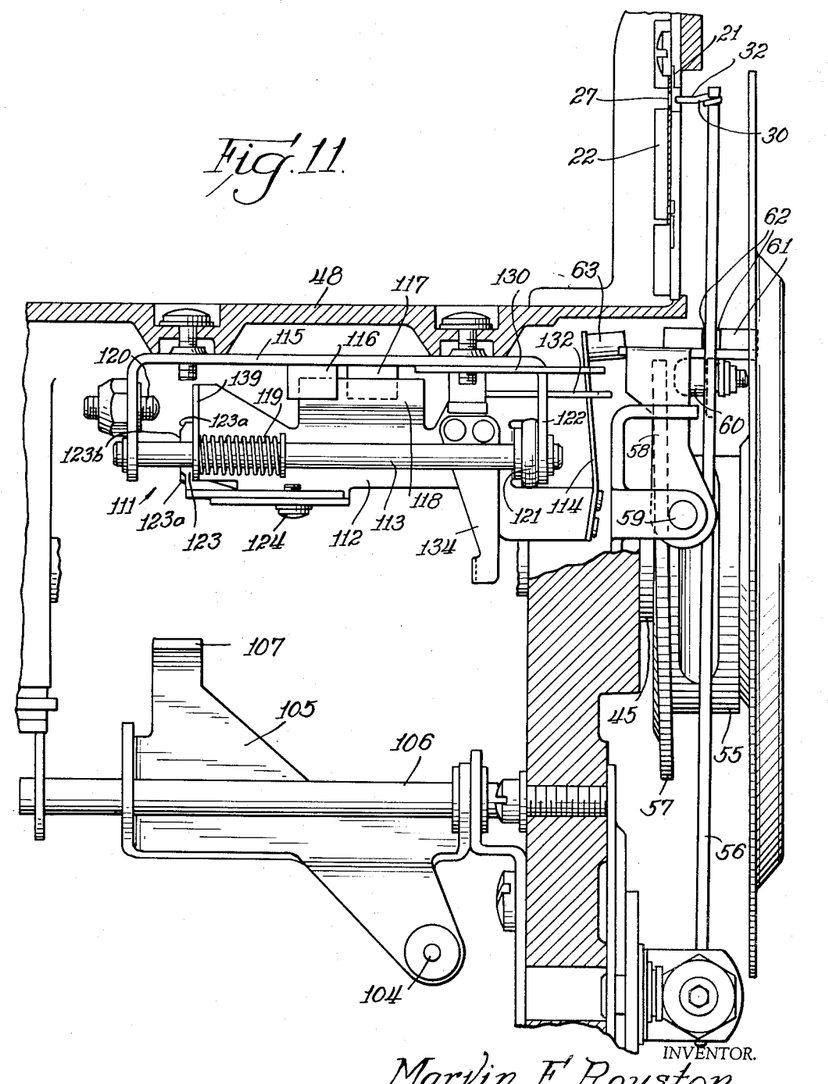
FIG. 11 is a view similar to FIG. 10 but with the clutch in a connecting condition.

To make the shuttle 30 inoperative whenever the clutch 49 is disconnected and to cause it to be operative for one feed stroke for each feed of one film frame during single frame projection, a clutch operated shuttle throwout mechanism 111 (FIGS. 3, 10 and 11) is provided. The mechanism 111 includes a carriage 112 slidable on a rod 113 and carrying leaf spring 114 having the presser 63 fixed to the free end thereof. The rod 113 is mounted on bracket 115 fixed to the frame plate 48 and having guide tabs 116 and 117 between which a slide 118 of the carriage fits. A spring 119 normally urges the carriage to a retracted position abutting an adjustment screw stop 120 as illustrated in FIG. 10 where the presser 63 is completely out of contact with the arm 58 and a resilient bumper 121 is away from arm 122 of the bracket 115.

Figures 12, 13, 14, 15, 16, 17:
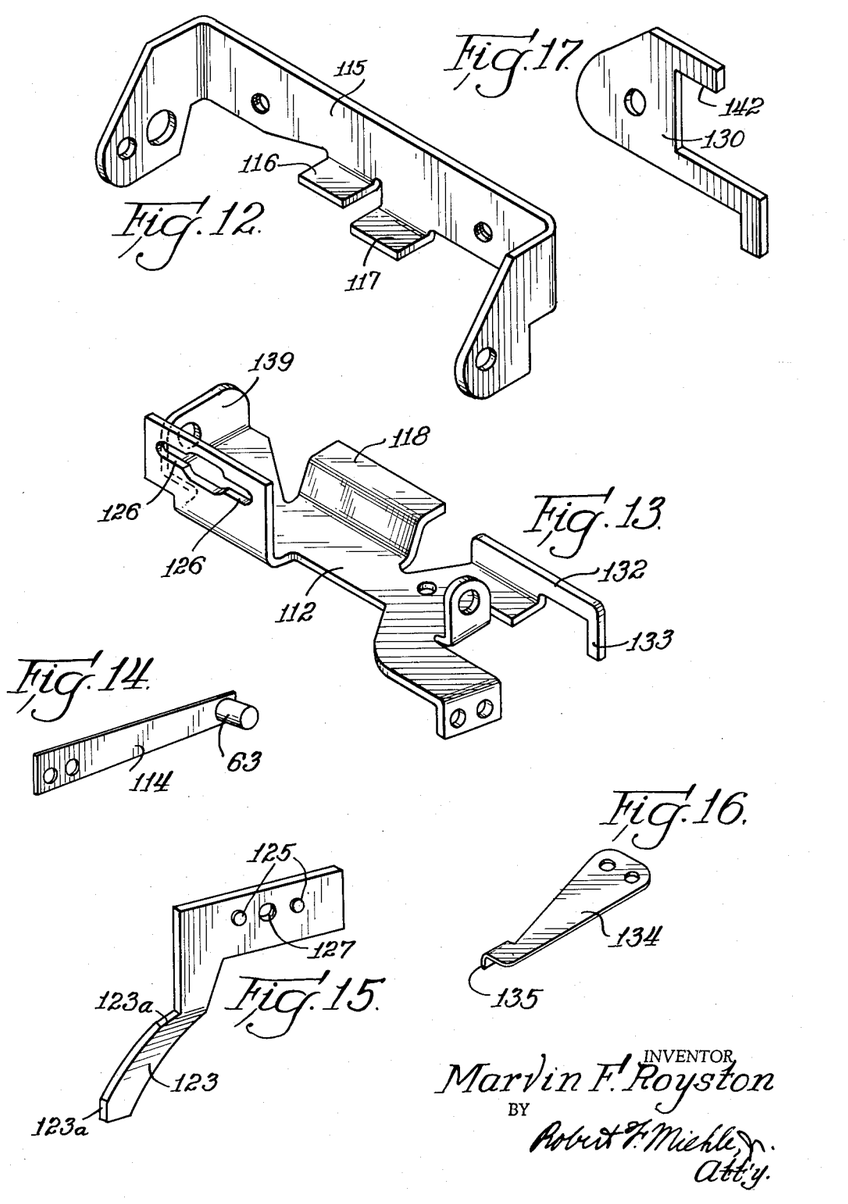
FIG. 12 is an enlarged perspective view of a bracket mounting a carriage which throws out the shuttle.
FIG. 13 is an enlarged perspective view of the carriage.
FIG. 14 is an enlarged perspective view of a resilient actuator carried by the carriage.
FIG. 15 is an enlarged perspective view of a cam member for driving the carriage.
FIG. 16 is an enlarged perspective view of a latch or stop member for the carriage.
FIG. 17 is an enlarged perspective view of a second stop for the carriage.

A cam segment 123 (FIGS. 7, 8 and 15) is adjustably fixed to the carriage 112 by a screw 124 threaded into a tapped bore 127 therein and has keying pins 125 swaged therefrom and fitting slidably in end slots 126. When the yoke 78 is moved to its declutching position and the disc 91, the worm 50 and the yoke 78 overtravel, as described above, a finger 128 of the yoke engages the cam segment 123 and moves the carriage 112 against spring 119 (FIG. 11) to its actuated position in which the bumper 121 is compressed and the presser 63 moves the lever 58 to its position holding the shuttle 30 out of engagement with the film. The cam 123 has sloping portions 123a at the ends of its lobe 123b to cam the finger 128 onto the lobe. A stop member 130 having a hook 131 prevents overtravel of the presser 63 by the spring 114 when the presser holds the shuttle out. When the carriage is retracted to permit feeding operation of the shuttle, a stop member 132 having a hook 133 limits movement of the presser by the spring 114. The carriage is latched when in its position holding the shuttle inoperative by a leaf spring latching arm 134 rivted thereto and having a latching finger 135 which snaps over a cup-shaped camming and latching segment 136 (FIGS. 3 and 9) of disc 137 bolted to the worm 50 and rotatable therewith. When the clutch 49 is actuated to rotate the worm 50, the latching segment 136 rotates out of engagement with the finger 135 and frees the finger 135 and carriage 112. The latching segment 136 covers a sufficient angle that it is operative to latch the finger during the above described overtravel of the worm 50 during declutching. The spring 119 (FIG. 10) then returns the carriage 112 to its retracted position to free the shuttle 30 for feeding engagement with the film as permitted by the wobbler 57. The spring 119 is mounted under compression between a collar 138 fixed to the rod 113 and an arm 139 of the carriage 112. Spring snap, U-shaped, washers 140 fit into grooves in the rod 113 to fix the rod 113 against longitudinal movement relative to the bracket 115. A snap washer 141 (FIG. 9) snaps over rod 45 and with the washer 75 holds the worm 50 (FIG. 3) against longitudinal movement relative to the shaft 45 while permitting rotating movement thereof relative to the shaft 45. The stop member 130 also has a notched portion 142 keying the member 130 to the bracket 115.

Figure 20:
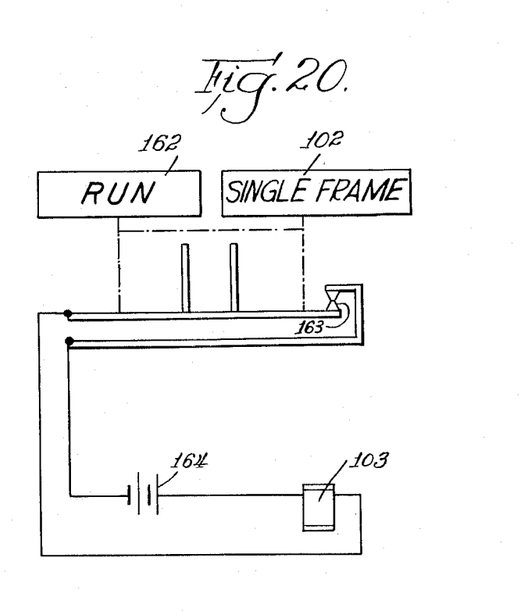
FIG. 20 is a schematic view of a control circuit of the projector shown in FIG. 1.
Figure 21:
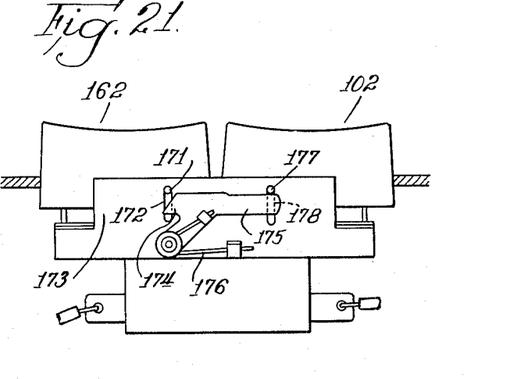
FIG. 21 is a sectional view showing a switch of the circuit shown in FIG. 20.

In FIGS. 20 and 21 there is shown a control circuit of the clutch 49 and a switch 161. The switch 161 includes the momentary push-button 102 which, when depressed, unlocks switch button 162 and opens contacts 163. In the normally closed position of contacts 163 the solenoid 103 is energized by a power source illustrated schematically as a battery 164. To move a single frame, the button 102 is manually depressed to open the switch contacts 163 and then is released and the contacts 163 close after de-energizing the solenoid 103 momentarily. The momentary energization of the solenoid 103 actuates the clutch 49 to advance the film one frame and then stop further feed of the film. If the push-button is held closed manually, the clutch 49 is held in to cause motion picture projection, which is useful in bringing the portion of the film to be shown in still or frame by frame projection to the aperture.

For continuous motion picture projection, the push-button 162 is pressed manually and is latched in position holding normally closed contacts 163 open. To stop the motion picture projection, the push-button 102 is depressed manually for an instant to release the push-button 162. Then the push-button 102 is released and the contacts 163 close to energize the solenoid 103 and throw out the clutch 49 as described above. The drive and control for driving the shaft 45 selectively in forward and reverse comprise well known means (not shown).

The switch button 162, when depressed to run the projector continuously, carries a pin 171 (FIG. 21) downwardly in a slot 172 in a plate 173 of the switch. The button 162 is urged upwardly by spring means (not shown) but when the button is fully depressed, the pin moves below a latching portion 174 of a lever 175 pivotally mounted on the plate 173. A torsion spring 176 then swings the latching portion 174 over the pin to hold the button 162 in its depressed position holding contacts 163 (FIG. 20) closed. To release the button 162, the button 102 is depressed momentarily and a pin 177 fixed to the button 102 swings the lever 175 to release the pin 171. The button 162 then snaps up. The pin 177 is movable in slot 178 in the wall 173. Thus, the button 102 is a stop button as well as being used for single frame projection.

The above projector may be selectively operated continuously or motion picture projection forward, continuously reverse, single frame projection forward or in reverse, or momentary continuous operation either forward or reverse when seeking a frame for still projection. The single frame clutch 49 operates for a single revolution in either forward or reverse and also serves to control the shuttle holdout mechanism 111 whenever drive of the worm 50 is effected. The clutch is simple, compact and rugged while precise and sure in its operation.

While the invention is thus described, it is not wished to be limited to the precise details described, as changes may be readily made without departing from the spirit of the invention.

What is claimed is:

1. In a motion picture projector including an aperture plate, an upper sprocket, a lower sprocket and a shuttle for advancing film past the gate, the improvement comprising a drive shaft rotatable continuously selectively in either direction, a worm mounted rotatably on the shaft, sprocket driving gears meshing with the worm, cam means driven continuously by the shaft for reciprocating the shuttle along the aperture plate, means urging the shuttle toward feeding engagement with film lying along the aperture plate, second cam means driven continuously by the shaft for intermittently permitting the urging means to move the shuttle into feeding engagement with the film, a first clutch member keyed to the shaft, a second clutch member keyed to the worm, detent means normally operable to connect the clutch members together, actuating means for moving the detent means to an inoperative position and holding the detent means in its inoperative position, shuttle throwout means operable by the detent means to hold the shuttle against the action of the urging means to keep the shuttle out of feeding engagement with the film at the end of a revolution of the worm, and latching means for latching the shuttle throwout means in its operable position.

2. The projector defined by claim 1 wherein the shuttle throwout means includes a member slidable along the shaft, and the latching means includes a disc having a latching segment keyed to the worm, and a spring latching arm carried by the member.

3. In a motion picture projector including a vertical frame plate, an aperture plate mounted on one side of the frame plate, upper and lower sprockets mounted on said one side of the frame plate, and a shuttle for feeding film along the aperture plate, the improvement comprising a drive shaft selectively rotatable continuously in either direction and mounted on the other side of the frame plate, cam means keyed to the shaft, means operable by the cam means for driving the shuttle, upper and lower gears on said other side of the shaft for rotating the sprockets, a worm mounted freely rotatably on the shaft and meshing with the gears, a driving clutch member keyed to the shaft, a driven clutch member keyed to the worm, a detent member keyed to the driven clutch member, means urging the detent member into interlocking engagement with the driving clutch member, an actuating cam rotatable relative to the shaft and the driven clutch member and operable when turned in either direction relative to the driven clutch member to cam the detent member to its declutching position out of engagement with the driving clutch member, a pawl member for holding the cam against movement with the driven clutch member to move the detent to its declutching position, means for latching detent member in its declutching position, a slide movable on the frame to an operative position by the detent when the detent is moved to its declutching position, and means operable by the slide to disable the shuttle driving means.

4. The projector defined by claim 3 wherein there is provided a spring mounted latch member carried by the slide, a disc keyed to the worm and having a radially projecting latching segment for interlocking with the latch member to hold the slide in its operative position, and spring means normally urging the slide toward a retracted position.

5. The projector defined by claim 3 wherein the shuttle driving means includes lever means pivotal vertically by the cam means and urged horizontally toward a film engaging position and normally permitted intermittently by the cam means to move into engagement with the film, and a presser mounted resiliently on the slide for engaging the lever means and holding the lever means in a position holding the shuttle away from the film.

6. The projector defined by claim 3 wherein the detent member is a yoke having a tab adapted to engage the driving clutch member, the actuating cam including cam portions normally engaged by both arms of the yoke when the yoke is in its clutching position and also having a finger projecting beyond the periphery of the driven clutch member, the driven clutch member having a peripheral notch for receiving the pawl after the pawl has engaged the finger of the actuating cam and has held the actuating cam throughout sufficient movement of the driven clutch member to move the detent member out of engagement with the driving clutch member.

7. In a motion picture projector,
a continuously rotating drive shaft,
a drive sprocket driven by said drive shaft and adapted to be disconnected therefrom,
a film gate including an aperture plate and a pressure plate,
a shuttle mounted for vertical and horizontal reciprocatory movement for feeding a film frame by frame through said film gate,
first cam means mounted for rotation with said drive shaft for reciprocating said shuttle into and out of engagement with a film in said film gate,
second cam means on said drive shaft for vertically reciprocating said shuttle,
biasing means for urging said shuttle toward said film gate and against said first cam means,
clutch means including a driving member mounted for continuous rotation with said drive shaft, and a driven member mounted for rotation with said drive sprocket, said shuttle and drive sprocket being synchronized with said driven member,
manually controlled actuating means for selectively disengaging and engaging said driven member with respect to said driving member, said manually controlled actuating means being effective to disengage or engage said members only when said driving member has been rotated to a predetermined angular position corresponding to the position in which a film passing through said film gate is stopped in a position wherein it is properly framed for still picture projection, said position being spaced one frame from the position the film was in when the actuating means was actuated, said driven member and drive sprocket stopping when said driven member is disengaged, and
a shuttle retraction linkage actuated by said clutch means in its disengaged condition when said driving member has been rotated to said predetermined position to force said shuttle against said biasing means and prevent said shuttle from engaging a film in said film gate,
whereby a motion picture film passing through said film gate can have a series of still pictures projected one picture at a time in a perfectly framed condition by repeatedly operating the manually actuated control means.

References Cited in the file of this patent

UNITED STATES PATENTS

| | | |
|---|---|---|
| 1,479,888 | Bowell | Jan. 8, 1924 |
| 1,582,032 | Gauriate | Apr. 27, 1926 |
| 1,802,045 | Bogopolsky | Apr. 21, 1931 |
| 1,950,166 | Durholz | Mar. 6, 1934 |
| 1,960,062 | Morsbach et al, | May 22, 1934 |
| 2,097,220 | Blum | Oct. 26, 1937 |
| 2,265,133 | Gollwitzer | Dec. 9, 1941 |
| 2,305,201 | Sloan | Dec. 15, 1942 |
| 2,390,389 | Redler | Dec. 4, 1945 |
| 2,483,040 | El-Mazzaoui | Sept. 27, 1949 |
| 2,606,476 | Waller et al. | Aug. 12, 1952 |
| 2,712,771 | Isom | July 12, 1955 |
| 2,717,676 | Johnson | Sept. 13, 1955 |
| 2,986,968 | Kropp et al. | June 6, 1961 |